(12) United States Patent
Orgeron

(10) Patent No.: US 8,192,129 B1
(45) Date of Patent: *Jun. 5, 2012

(54) PIPE HANDLING BOOM PRETENSIONING APPARATUS

(75) Inventor: Keith J. Orgeron, Spring, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/789,332

(22) Filed: May 27, 2010

Related U.S. Application Data

(60) Division of application No. 12/013,979, filed on Jan. 14, 2008, now Pat. No. 7,726,929, which is a continuation-in-part of application No. 11/923,451, filed on Oct. 24, 2007, now Pat. No. 7,918,636.

(51) Int. Cl.
*E21B 19/00* (2006.01)
*B66F 9/00* (2006.01)
*E02F 3/00* (2006.01)
*B66C 23/06* (2006.01)
*B66C 23/92* (2006.01)

(52) U.S. Cl. ...................... 414/22.55; 414/720; 414/913; 901/48; 212/255; 212/293

(58) Field of Classification Search ............... 166/77.52, 166/77.53; 175/85; 294/81.61; 414/22.55, 414/22.62, 23, 546, 680, 729, 738, 740, 742, 414/746.8, 783, 222.03, 701–702, 718–720, 414/913; 52/119–120, 146, 148–149; 74/103, 74/110; 901/15, 21–22, 48, 20; 212/195, 212/272–274, 276, 280–281, 293, 255; 267/218
See application file for complete search history.

(56) References Cited

U.S. PATENT DOCUMENTS 62,404 A 2/1867 Gile et al.
(Continued)

FOREIGN PATENT DOCUMENTS

EP 0024433 A1 3/1981
(Continued)

OTHER PUBLICATIONS

U.S. Appl. No. 12/111,907, filed Apr. 29, 2008; non-published; titled "Pipe Gripping Apparatus" and having common inventors with the present patent application.

(Continued)

*Primary Examiner* — Gregory Adams
(74) *Attorney, Agent, or Firm* — John G. Fischer, Esq.; Paul D. Lein, Esq.; Scheef & Stone, L.L.P.

(57) ABSTRACT

A pre-loading system for a pipe handling apparatus in which a boom is pivotally mounted at one end to a skid and in which an arm is connected to an opposite end of the boom. The pre-loading system has a tensioning assembly with one end affixed to the arm and an opposite end fixedly mounted so as to apply tension to the arm when the arm has a load applied to an end of the arm opposite the boom. The tensioning assembly includes a first cable assembly having one end connected to the arm and an opposite end fixedly mounted, and a second cable assembly connected to the arm and having an opposite end fixedly mounted. The first and second cable assemblies extend from opposite sides of the arm.

11 Claims, 7 Drawing Sheets

U.S. PATENT DOCUMENTS

| | | | |
|---|---|---|---|
| 184,168 A | 11/1876 | Nickle | |
| 364,077 A * | 5/1887 | Addis | 52/146 |
| 514,715 A | 2/1894 | Jenkins | |
| 1,175,792 A | 3/1916 | Mickelsen | |
| 1,249,194 A | 12/1917 | Race | |
| 1,264,867 A | 4/1918 | Schuh | |
| 1,312,009 A | 8/1919 | Thrift | |
| 1,318,789 A | 10/1919 | Moschel | |
| 1,369,165 A | 2/1921 | Cochran et al. | |
| 1,396,317 A | 11/1921 | Boyter | |
| 1,417,490 A | 5/1922 | Brandon | |
| 1,972,635 A | 9/1934 | Whinnen | |
| 1,981,304 A | 11/1934 | Brandt | |
| 2,124,154 A | 7/1937 | Sovincz | |
| 2,147,002 A | 2/1939 | Volpin | |
| 2,327,461 A | 8/1943 | Rowe | |
| 2,369,534 A | 2/1945 | Cohen | |
| 2,382,767 A | 8/1945 | Zeilman | |
| 2,476,210 A | 7/1949 | Moore | |
| 2,497,083 A | 2/1950 | Hildebrand | |
| 2,509,853 A | 5/1950 | Wilson | |
| 2,535,054 A | 12/1950 | Ernst | |
| 2,592,168 A | 8/1952 | Morris et al. | |
| 2,715,014 A | 8/1955 | Garnett et al. | |
| 2,770,493 A | 11/1956 | Fieber | |
| 2,814,396 A | 11/1957 | Neal, Sr. | |
| 2,828,024 A | 3/1958 | True | |
| 2,840,244 A | 6/1958 | Thomas, Jr. | |
| 2,937,726 A | 5/1960 | Manfred et al. | |
| 3,033,529 A * | 5/1962 | Pierrat | 74/89.2 |
| 3,059,905 A | 10/1962 | Tompkins | |
| 3,076,560 A | 2/1963 | Bushong et al. | |
| 3,177,944 A | 4/1965 | Knights | |
| 3,194,313 A | 7/1965 | Fanshawe | |
| 3,262,593 A | 7/1966 | Hainer | |
| 3,280,920 A | 10/1966 | Scott | |
| 3,331,585 A | 7/1967 | Dubberke | |
| 3,365,762 A | 1/1968 | Spiri | |
| 3,464,507 A | 9/1969 | Alexander et al. | |
| 3,498,375 A | 3/1970 | McEwen et al. | |
| 3,561,811 A | 2/1971 | Tumer, Jr. | |
| 3,633,771 A | 1/1972 | Woolslayer et al. | |
| 3,682,259 A | 8/1972 | Cintract et al. | |
| 3,702,640 A | 11/1972 | Contract et al. | |
| 3,703,968 A | 11/1972 | Uhrich et al. | |
| 3,774,781 A | 11/1973 | Merkley | |
| 3,792,783 A | 2/1974 | Brown | |
| 3,805,463 A | 4/1974 | Lang et al. | |
| 3,806,021 A | 4/1974 | Moroz et al. | |
| 3,823,916 A | 7/1974 | Shaw | |
| 3,848,850 A | 11/1974 | Bemis | |
| 3,860,122 A | 1/1975 | Cernosek | |
| 3,883,009 A | 5/1975 | Swoboda et al. | |
| 3,963,133 A | 6/1976 | Gilli | |
| 3,986,619 A | 10/1976 | Woolslayer et al. | |
| 3,991,887 A | 11/1976 | Trout | |
| 3,995,746 A | 12/1976 | Usagida | |
| 4,007,782 A | 2/1977 | Nybo et al. | |
| 4,011,694 A | 3/1977 | Langford | |
| 4,030,698 A | 6/1977 | Hansen | |
| 4,044,952 A * | 8/1977 | Williams et al. | 239/165 |
| 4,142,551 A | 3/1979 | Wilms | |
| 4,158,283 A | 6/1979 | Nation | |
| 4,172,684 A | 10/1979 | Jenkins | |
| 4,221,269 A | 9/1980 | Hudson | |
| 4,269,554 A | 5/1981 | Jackson | |
| 4,276,918 A * | 7/1981 | Sigouin | 144/24.13 |
| 4,277,044 A | 7/1981 | Hamilton | |
| 4,303,270 A | 12/1981 | Adair | |
| 4,336,840 A | 6/1982 | Bailey | |
| 4,359,089 A | 11/1982 | Strate et al. | |
| 4,386,883 A | 6/1983 | Hogan et al. | |
| 4,403,666 A | 9/1983 | Willis | |
| 4,403,897 A | 9/1983 | Willis | |
| 4,403,898 A | 9/1983 | Thompson | |
| 4,407,629 A | 10/1983 | Willis | |
| 4,420,917 A | 12/1983 | Parlanti | |
| 4,426,182 A | 1/1984 | Frias et al. | |
| 4,440,536 A | 4/1984 | Scaggs | |
| 4,492,501 A | 1/1985 | Haney | |
| 4,529,094 A | 7/1985 | Wadsworth | |
| 4,547,110 A | 10/1985 | Davidson et al. | |
| 4,595,066 A | 6/1986 | Nelmark et al. | |
| 4,605,077 A | 8/1986 | Boyadjieff | |
| 4,650,237 A | 3/1987 | Lessway | |
| 4,658,970 A | 4/1987 | Oliphant | |
| 4,688,983 A | 8/1987 | Lindbom | |
| 4,708,581 A | 11/1987 | Adair | |
| 4,756,204 A | 7/1988 | Wittwer et al. | |
| 4,759,414 A | 7/1988 | Willis | |
| 4,765,225 A | 8/1988 | Birchard | |
| 4,765,401 A | 8/1988 | Boyadjieff | |
| 4,822,230 A | 4/1989 | Slettedal | |
| 4,834,604 A | 5/1989 | Brittain et al. | |
| 4,869,137 A | 9/1989 | Slator | |
| 4,982,853 A * | 1/1991 | Kishi | 212/231 |
| 5,060,762 A | 10/1991 | White | |
| 5,121,793 A | 6/1992 | Busch et al. | |
| 5,135,119 A | 8/1992 | Larkin | |
| 5,186,264 A | 2/1993 | du Chaffaut | |
| 5,415,057 A | 5/1995 | Nihei et al. | |
| 5,458,454 A | 10/1995 | Sorokan | |
| 5,595,248 A | 1/1997 | Denny | |
| 5,597,987 A | 1/1997 | Gilliland et al. | |
| 5,609,226 A | 3/1997 | Penisson | |
| 5,609,457 A | 3/1997 | Burns | |
| 5,649,745 A | 7/1997 | Anderson | |
| 5,660,087 A | 8/1997 | Rae | |
| 5,671,932 A | 9/1997 | Chapman | |
| 5,806,589 A | 9/1998 | Lang | |
| 5,816,565 A | 10/1998 | McGuffin | |
| 5,848,647 A | 12/1998 | Webre et al. | |
| 5,931,238 A | 8/1999 | Gilmore et al. | |
| 5,934,028 A | 8/1999 | Taylor | |
| 5,957,431 A | 9/1999 | Serda, Jr. | |
| 5,964,550 A | 10/1999 | Blandford et al. | |
| 5,992,801 A | 11/1999 | Torres | |
| 5,993,140 A | 11/1999 | Crippa | |
| 6,003,598 A | 12/1999 | Andreychuk | |
| 6,053,255 A | 4/2000 | Crain | |
| 6,079,490 A | 6/2000 | Newman | |
| 6,079,925 A | 6/2000 | Morgan et al. | |
| 6,158,516 A | 12/2000 | Smith et al. | |
| 6,220,807 B1 | 4/2001 | Sorokan | |
| 6,227,587 B1 | 5/2001 | Terral | |
| 6,234,253 B1 | 5/2001 | Dallas | |
| 6,253,845 B1 | 7/2001 | Belik | |
| 6,263,763 B1 | 7/2001 | Feigel, Jr. et al. | |
| 6,264,128 B1 | 7/2001 | Shampine et al. | |
| 6,264,395 B1 | 7/2001 | Allamon et al. | |
| 6,276,450 B1 | 8/2001 | Seneviratne | |
| 6,279,662 B1 | 8/2001 | Sonnier | |
| 6,311,788 B1 | 11/2001 | Weixler | |
| 6,343,892 B1 | 2/2002 | Kristiansen | |
| 6,398,186 B1 | 6/2002 | Lemoine | |
| 6,431,286 B1 | 8/2002 | Andreychuk | |
| 6,471,439 B2 | 10/2002 | Allamon et al. | |
| 6,502,641 B1 | 1/2003 | Carriere et al. | |
| 6,524,049 B1 | 2/2003 | Minnes | |
| 6,543,551 B1 | 4/2003 | Sparks et al. | |
| 6,543,555 B2 | 4/2003 | Casagrande | |
| 6,550,128 B1 | 4/2003 | Lorenz | |
| 6,557,641 B2 | 5/2003 | Sipos et al. | |
| 6,564,667 B2 | 5/2003 | Bayer et al. | |
| 6,581,698 B1 | 6/2003 | Dirks | |
| 6,609,573 B1 | 8/2003 | Day | |
| 6,705,414 B2 | 3/2004 | Simpson et al. | |
| 6,745,646 B1 | 6/2004 | Pietras et al. | |
| 6,748,823 B2 | 6/2004 | Pietras | |
| 6,763,898 B1 | 7/2004 | Roodenburg et al. | |
| 6,779,614 B2 | 8/2004 | Oser | |
| 6,814,149 B2 | 11/2004 | Liess et al. | |
| 6,845,814 B2 | 1/2005 | Mason et al. | |
| 6,854,520 B1 | 2/2005 | Robichaux | |
| 6,969,223 B2 | 11/2005 | Tolmon et al. | |
| 7,017,450 B2 | 3/2006 | Bangert | |
| 7,021,880 B2 | 4/2006 | Morelli et al. | |

| | | |
|---|---|---|
| 7,028,585 B2 | 4/2006 | Pietras et al. |
| 7,036,202 B2 | 5/2006 | Lorenz |
| 7,040,411 B2 | 5/2006 | Kainer et al. |
| 7,044,315 B2* | 5/2006 | Willim .................. 212/299 |
| 7,055,594 B1 | 6/2006 | Springett et al. |
| 7,077,209 B2 | 7/2006 | McCulloch et al. |
| 7,090,035 B2 | 8/2006 | Lesko |
| 7,090,254 B1 | 8/2006 | Pietras et al. |
| 7,117,938 B2 | 10/2006 | Hamilton et al. |
| 7,121,166 B2 | 10/2006 | Drzewiecki |
| 7,172,038 B2 | 2/2007 | Terry et al. |
| 7,249,639 B2 | 7/2007 | Belik |
| 7,289,871 B2 | 10/2007 | Williams |
| 7,296,623 B2 | 11/2007 | Koithan et al. |
| 7,398,833 B2 | 7/2008 | Ramey et al. |
| 7,438,127 B2 | 10/2008 | Lesko |
| 7,503,394 B2 | 3/2009 | Bouligny |
| 7,726,929 B1* | 6/2010 | Orgeron .................. 414/22.55 |
| 7,918,636 B1* | 4/2011 | Orgeron .................. 414/22.55 |
| 7,946,795 B2 | 5/2011 | Orgeron |
| 7,980,802 B2* | 7/2011 | Orgeron .................. 414/22.55 |
| 8,011,426 B1 | 9/2011 | Orgeron |
| 2002/0070187 A1* | 6/2002 | Willim .................. 212/299 |
| 2002/0079105 A1 | 6/2002 | Bergeron |
| 2003/0170095 A1 | 9/2003 | Slettedal |
| 2003/0221871 A1 | 12/2003 | Hamilton et al. |
| 2006/0045654 A1 | 3/2006 | Guidroz |
| 2006/0151215 A1 | 7/2006 | Skogerbo |
| 2006/0278400 A1 | 12/2006 | Bouligny |
| 2008/0023432 A1 | 1/2008 | Paschke |
| 2008/0078965 A1 | 4/2008 | Lane et al. |
| 2008/0174131 A1 | 7/2008 | Bouligny et al. |
| 2008/0202812 A1 | 8/2008 | Childers et al. |
| 2008/0253866 A1 | 10/2008 | Lops et al. |
| 2009/0232624 A1* | 9/2009 | Orgeron .................. 414/22.55 |
| 2010/0032213 A1* | 2/2010 | Orgeron .................. 175/85 |
| 2010/0034619 A1 | 2/2010 | Orgeron |
| 2010/0187740 A1 | 7/2010 | Orgeron |
| 2010/0230166 A1 | 9/2010 | Sigmar et al. |
| 2010/0254784 A1 | 10/2010 | Orgeron et al. |
| 2010/0296899 A1* | 11/2010 | Orgeron .................. 414/22.55 |
| 2011/0030942 A1 | 2/2011 | Orgeron |
| 2011/0200412 A1 | 8/2011 | Orgeron |

FOREIGN PATENT DOCUMENTS

| | | |
|---|---|---|
| GB | 2264736 A | 9/1993 |
| JP | 05044385 A | 2/1993 |
| JP | 2001287127 A | 10/2001 |
| WO | 9315303 A1 | 8/1993 |
| WO | 02057593 A1 | 7/2002 |
| WO | 2006038790 A1 | 4/2006 |

OTHER PUBLICATIONS

U.S. Appl. No. 12/371,590, filed Feb. 14, 2009; non-published; titled "Tubular Gripping Apparatus" and having common inventors with the present patent application.

U.S. Appl. No. 12/371,593, filed Feb. 14, 2009; non-published; titled "Pipe Handling Apparatus With Stab Frame Stiffening" and having common inventors with the present patent application.

U.S. Appl. No. 12/632,261, filed Dec. 7, 2009; non-published; titled "Stabbing Apparatus and Method" and having common inventors with the present patent application.

U.S. Appl. No. 12/633,891, filed Dec. 9, 2009; non-published; titled "Stabbing Apparatus for Centering Tubulars and Casings for Connection at a Wellhead" and having common inventors with the present patent application.

U.S. Appl. No. 12/633,913, filed Dec. 9, 2009; non-published; titled "Apparatus for a Pipe Tong and Spinner Deployment" and having common inventors with the present patent application.

U.S. Appl. No. 13/114,842, filed May 24, 2011; non-published; titled "Telescoping Jack for a Gripper Assembly" and having common inventors with the present patent application.

U.S. Appl. No. 13/226,343, filed Sep. 6, 2011; non-published; titled "Method of Gripping a Tubular With a Tubular Gripping Mechanism" and having common inventors with the present patent application.

U.S. Appl. No. 13/335,794, filed Dec. 22, 2011; not yet published; titled "Fast Transportable Drilling Rig System" and having common inventors with the present patent application.

Chronis, Nicholas P.; Mechanisms & Mechanical Devices Sourcebook, 1991, Ch. 10, pp. 399-414, ISBN 0-07-010918-4, McGraw-Hill, Inc.

* cited by examiner

PIPE HANDLING BOOM PRETENSIONING APPARATUS

CROSS-REFERENCE TO RELATED U.S. APPLICATIONS

The present application is a divisional of U.S. application Ser. No. 12/013,979, filed on Jan. 14, 2008, entitled "Pipe Handling Boom Pretensioning Apparatus," and issued as U.S. Pat. No. 7,726,929, which is a continuation-in-part of U.S. application Ser. No. 11/923,451, filed on Oct. 24, 2007, entitled "Pipe Handling Apparatus and Method," and issued as U.S. Pat. No. 7,918,636.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a tubular, or pipe, handling apparatus and casing stabbing apparatus. More particularly, the present invention relates to a pipe handling apparatus for moving a pipe from a horizontal orientation to a vertical orientation. Additionally, the present invention relates to a pipe handling apparatus for installing pipes and casing upon a drilling rig. The present invention also relates to a pipe handling apparatus that moves the pipe with a single degree of freedom.

2. Description of Related Art

Including Information Disclosed Under 37 CFR 1.97 and 37 CFR 1.98.

Drill rigs have utilized several methods for transferring tubular members from a pipe rack adjacent to the drill floor to a mousehole in the drill floor or the well bore for connection to a previously transferred tubular or tubular string. The term "tubular" or "pipe" as used herein includes all forms of drill pipe, drill collars, casing, liner, bottom hole assemblies (BHA), and other types of tubulars known in the art.

Conventionally, drill rigs have utilized a combination of the rig cranes and the traveling system for transferring a tubular from the pipe rack to a vertical position above the center of the well. The obvious disadvantage with the prior art systems is that there is a significant manual involvement in attaching the pipe elevators to the tubular and moving the pipe from the drill rack to the rotary table. This manual transfer operation in the vicinity of workers is potentially dangerous and has caused numerous injuries in drilling operations. Further, the hoisting system may allow the tubular to come into contact with the catwalk or other portions of the rig as the tubular is transferred from the pipe rack to the drill floor. This can damage the tubular and may affect the integrity of the connections between successive tubulars in the well.

One method of transferring pipe from the rack to the well platform comprises tying one end of a line on the rig around a selected pipe on the pipe rack. The pipe is thereafter lifted up onto the platform and the lower end thereof is placed into the mousehole. The mousehole is simply an upright, elongate cylindrical container adjacent to the rotary table which supports the pipe temporally. When it is necessary to add the pipe to the drill string, slips are secured about the drill string on the rotary table thereby supporting the same in the well bore. The pipe is disconnected from the traveling equipment, and the elevators, or the kelly, are connected to the pipe in the mousehole. Next, the traveling block is raised by positioning the pipe over the drill string. Tongs are used to secure the pipe to the upper end of the drill string. The drill pipe elevators suspend the drill pipe from a collar, which is formed around one end of the pipe and does not clamp the pipe, thereby permitting rotational pipe movement in order to threadably engage the same to the drill string.

A prior art technique for moving joints of casing from racks adjacent to the drilling rig comprises tying a line from the rig onto one end of a selected casing joint on the rack. The line is raised by lifting the casing joint up a ramp leading to the rig platform. As the rope lifts the casing from the rack, the lower end of the casing swings across the platform in a dangerous manner. The danger increases when a floating system is used in connection with drilling. Because the rope is tied around the casing at one end thereof, the casing does not hang vertically, but rather tilts somewhat. A man working on a platform elevated above the rig floor must hold the top of the casing and straighten it out while the casing is threaded into the casing string which is suspended in the well bore by slips positioned on the rotary table.

It is desirable to be able to grip casing or pipe positioned on a rack adjacent a drilling well, move the same into vertical orientation over the well bore, and thereafter lower the same onto the string suspended in the well bore.

In the past, various devices have been created which mechanically move a pipe from a horizontal orientation to a vertical orientation such that the vertically oriented pipe can be installed into the well bore. Typically, these devices have utilized several interconnected arms that are associated with a boom. In order to move the pipe, a succession of individual movements of the levers, arms, and other components of the boom must be performed in a coordinated manner in order to achieve the desired result. Typically, a wide variety of hydraulic actuators are connected to each of the components so as to carry out the prescribed movement. A complex control mechanism is connected to each of these actuators so as to achieve the desired movement. Advanced programming is required of the controller in order to properly coordinate the movements in order to achieve this desired result.

Unfortunately, with such systems, the hydraulic actuators, along with other components, can become worn with time. Furthermore, the hydraulic integrity of each of the actuators can become compromised over time. As such, small variations in each of the actuators can occur. These variations, as they occur, can make the complex mechanism rather inaccurate. The failure of one hydraulic component can exacerbate the problems associated with the alignment of the pipe in a vertical orientation. Adjustments of the programming are often necessary so as to continue to achieve the desired results. Fundamentally, the more hydraulic actuators incorporated into such a system, the more likely it is to have errors, inaccuracies, and deviations in the desired delivery profile of the tubular. Typically, very experienced and knowledgeable operators are required so as to carry out this pipe movement operation. This adds significantly to the cost associated with pipe delivery.

In the past, pipe handling apparatus have not been used for the installation of casing. The problem associated with casing is that the threads of the casing are formed on an inner wall and on an outer wall at the ends of each of the casing sections. Whenever these threads are formed, the relatively thin wall thickness of the casing is further minimized. Additionally, great precision is required so as to properly thread the threads of one casing section within the threads of an adjacent casing section. The amount of accuracy required for the delivery of the casing by a pipe handling apparatus, in the past, has not been sufficient so as to achieve the desired degree of accuracy for the installation of the casing sections in their threaded connection. The improper installation of one casing section upon another casing section can potentially damage the threads associated with such casing sections. Additionally, in the past, the pipe handling apparatus could potentially damage the thin-walled casing sections during the delivery. As such, a need has developed to adapt a pipe handling apparatus so as to achieve the desired amount of accuracy for the installation of casing sections.

In the past, various patents have issued relating to such pipe handling devices. For example, U.S. Pat. No. 3,177,944, issued on Apr. 13, 1965, to R. N. Knights, describes a racking mechanism for earth boring equipment that provides for horizontal storage of pipe lengths on one side of and clear of the derrick. This is achieved by means of a transport arm which is pivoted toward the base of the derrick for swing movement in a vertical plane. The outer end of the arm works between a substantially vertical position in which it can accept a pipe length from, or deliver a pipe length to, a station in the derrick, and a substantially horizontal portion in which the arm can deliver a pipe length to, or accept a pipe length from, a station associated with storage means on one side of the derrick.

U.S. Pat. No. 3,464,507, issued on Sep. 2, 1969, to E. L. Alexander et al., teaches a portable rotary pipe handling system. This system includes a mast pivotally mounted and movable between a reclining transport position to a desired position at the site drilling operations which may be at any angle up to vertical. The mast has guides for a traveling mechanism that includes a block movable up and down the mast through operation of cables reeved from the traveling block over crown block pulleys into a drawwork. A power drill drive is carried by the traveling block. An elevator for drill pipe is carried by an arm swingably mounted relative to the power unit. Power tongs, slips, and slip bushings are supported adjacent the lower end of the mast and adapted to have a drill pipe extend therethrough from a drive bushing connected to a power drive whereby the drill pipe is extended in the direction of the hole to be drilled.

U.S. Pat. No. 3,633,771 issued on Jan. 11, 1972, to Woolslayer et al., discloses an apparatus for moving drill pipe into and out of an oil well derrick. A stand of pipe is gripped by a strong back which is pivotally mounted to one end of a boom. The boom swings the strong back over the rotary table thereby vertically aligning the pipe stand with the drill string. When both adding pipe to and removing pipe from the drill string, all vertical movement of the pipe is accomplished by the elevator suspended from the traveling block.

U.S. Pat. No. 3,860,122, issued on Jan. 14, 1975, to L. C. Cernosek, describes an apparatus for transferring a tubular member, such as a pipe, from a storage area to an oil well drilling platform. The positioning apparatus includes a pipe positioner mounted on a platform for moving the pipe to a release position whereby the pipe can be released to be lowered to a submerged position. A load means is operably attached or associated with the platform and positioning means in order to move the pipe in a stored position to a transfer position in which the pipe is transferred to the positioner. The positioner includes a tower having pivotally mounted thereon a pipe track with a plurality of pipe clamp assemblies which are adapted to receive a pipe length. The pipe track is pivotally movable by a hydraulic power means or gear means between a transfer position in which pipe is moved into the plurality of clamp assemblies and the release position in which the pipe is released for movement to a submerged position.

U.S. Pat. No. 3,986,619, issued on Oct. 19, 1976, to Woolslayer et al., shows a pipe handling apparatus for an oil well drilling derrick. In this apparatus, the inner end of the boom is pivotally supported on a horizontal axis in front of a well. A clamping means is pivotally connected to the outer end of the boom on an axis parallel to the horizontal axis at one end. The clamping means allows the free end of the drill pipe to swing across the boom as the outer end of the boom is raised or lowered. A line is connected at one end with the traveling block that raises and lowers the elevators and at the other end to the boom so as to pass around sheaves.

U.S. Pat. No. 4,172,684, issued on Oct. 30, 1979, to C. Jenkins, shows a floor level pipe handling apparatus which is mounted on the floor of an oil well derrick suitable structure. This apparatus includes a support that is rockable on an axis perpendicular to the centerline of a well being drilled. One end of an arm is pivotally mounted on the support on an axis transverse to the centerline of the well. The opposite end of the arm carries a pair of shoes having laterally opening pipe-receiving seats facing away from the arm. The free end of the arm can be swung toward and away from the well centerline and the arm support can be rocked to swing the arm laterally.

U.S. Pat. No. 4,403,666, issued on Sep. 13, 1983, to C. A. Willis, shows self-centering tongs and a transfer arm for a drilling apparatus. The clamps of the transfer arm are resiliently mounted to the transfer arm so as to provide limited axial movement of the clamps and thereby of a clamped down hole tubular. A pair of automatic, self-centering, hydraulic tongs is provided for making up and breaking out threaded connections of tubulars.

U.S. Pat. No. 4,407,629, issued on Oct. 4, 1983, to C. A. Willis, teaches a lifting apparatus for downhole tubulars. This lifting apparatus includes two rotatably mounted clamps which are rotatable between a side loading-position so as to facilitate the loading and unloading in the horizontal position, and a central position, in which a clamped tubular is aligned with the drilling axis when the boom is in the vertical position. An automatic hydraulic sequencing circuit is provided to automatically rotate the clamps into the side-loading position whenever the boom is pivoted with a down-hole tubular positioned in the clamp. In this position, the clamped tubular is aligned with a safety plate mounted on the boom to prevent a clamped tubular from slipping from the clamps.

U.S. Pat. No. 4,492,501, issued on Jan. 8, 1985, to K. M. Haney, provides a platform positioning system for a drilling operation which includes a support structure and a transfer arm pivotally connected to the support structure to rotate about a first axis. This platform positioning system includes a platform which is pivotally connected to the support structure to rotate about a second axis, and rod which is mounted between the transfer arm and the platform. The position of the arm and platform axes and the length of the rod are selected such that the transfer arm automatically and progressively raises the platform to the raised position by means of the rod as the transfer arm moves to the raised position. The transfer arm automatically and progressively lowers the platform to the lowered position by means of the rod as the transfer arm moves to the lowered position.

U.S. Pat. No. 4,595,066, issued on Jun. 17, 1986, to Nelmark et al., provides an apparatus for handling drill pipes and used in association with blast holes. This system allows a drill pipe to be more easily connected and disconnected to a drill string in a hole being drilled at an angle. A receptacle is formed at the lower end of the carrier that has hydraulically operated doors secured by a hydraulically operated lock. A gate near the upper end is pneumatically operated in response to the hydraulic operation of the receptacle lock.

U.S. Pat. No. 4,822,230, issued on Apr. 18, 1989, to P. Slettedal, teaches a pipe handling apparatus which is adapted for automated drilling operations. Drill pipes are manipulated between substantially horizontal and vertical positions. The apparatus is used with a top mounted drilling device which is rotatable about a substantially horizontal axis. The apparatus utilizes a strongback provided with clamps to hold and manipulate pipes. The strongback is rotatably connected to the same axis as the drilling device. The strong back moves up or down with the drilling device. A brace unit is attached to the strongback to be rotatable about a second axis.

U.S. Pat. No. 4,834,604, issued on May 30, 1989, to Brittain et al., provides a pipe moving apparatus and method for moving casing or pipe from a horizontal position adjacent a well to a vertical position over the well bore. The machine includes a boom movable between a lowered position and a raised position by a hydraulic ram. A strongback grips the pipe and holds the same until the pipe is vertically positioned. Thereafter, a hydraulic ram on the strongback is actuated thereby lowering the pipe or casing onto the string suspended in the well bore and the additional pipe or casing joint is threaded thereto.

U.S. Pat. No. 4,708,581 issued on Nov. 24, 1987, to H. L. Adair, provides a method for positioning a transfer arm for the movement of drill pipe. A drilling mast and a transfer arm are mounted at a first axis adjacent the mast to move between a lowered position near ground level and an upper position aligned with the mast. A reaction point anchor is fixed with respect to the drilling mast and spaced from the first axis. A fixed length link is pivotably mounted to the transfer arm at a second axis, spaced from the first axis, and a first single stage cylinder is pivotably mounted at one end to the distal end of the link and at the other end to the transfer arm. A second single stage hydraulic cylinder is pivotably mounted at one end to the distal end of the link and at the other end to the reaction point.

U.S. Pat. No. 4,759,414, issued on Jul. 26, 1988, to C. A. Willis, provides a drilling machine which includes a drilling superstructure skid which defines two spaced-apart parallel skid runners and a platform. The platform supports a drawworks mounted on a drawworks skid and a pipe boom is mounted on a pipe boom skid sized to fit between the skid runners of the drilling substructure skid. The drilling substructure skid supports four legs which, in turn, support a drilling platform on which is mounted a lower mast section. The pipe boom skid mounts a pipe boom as well as a boom linkage, a motor, and a hydraulic pump adapted to power the pipe boom linkage. Mechanical position locks hold the upper skid in relative position over the lower skid.

U.S. Pat. No. 5,458,454, issued on Oct. 17, 1995, to R. S. Sorokan, describes a pipe handling method which is used to move tubulars used from a horizontal position on a pipe rack adjacent the well bore to a vertical position over the wall center. This method utilizes bicep and forearm assemblies and a gripper head for attachment to the tubular. The path of the tubular being moved is close to the conventional path of the tubular utilizing known cable transfer techniques so as to allow access to the drill floor through the V-door of the drill rig. U.S. Pat. No. 6,220,807 describes apparatus for carrying out the method of U.S. Pat. No. 5,458,454.

U.S. Pat. No. 6,609,573, issued on Aug. 26, 2003, to H. W. F. Day, teaches a pipe handling system for an offshore structure. The pipe handling system transfers the pipes from a horizontal pipe rack adjacent to the drill floor to a vertical orientation in a set-back area of the drill floor where the drill string is made up for lowering downhole. The cantilevered drill floor is utilized with the pipe handling system so as to save platform space.

U.S. Pat. No. 6,705,414, issued on Mar. 16, 2004, to Simpson et al., describes a tubular transfer system for moving pipe between a substantially horizontal position on the catwalk and a substantially vertical position at the rig floor entry. Bundles of individual tubulars are moved to a process area where a stand make-up/break-out machine makes up the tubular stands. The bucking machine aligns and stabs the connections and makes up the connection to the correct torque. The tubular stand is then transferred from the machine to a stand storage area. A trolley is moved into position over the pick-up area to retrieve the stands. The stands are clamped to the trolley and the trolley is moved from a substantially horizontal position to a substantially vertical position at the rig floor entry. A vertical pipe-racking machine transfers the stands to the traveling equipment. The traveling equipment makes up the stand connection and the stand is run into the hole.

U.S. Pat. No. 6,779,614, issued on Aug. 24, 2004, to M. S. Oser, shows another system and method for transferring pipe. A pipe shuttle is used for moving a pipe joint into a first position and then lifting upwardly toward an upper second position.

U.S. application Ser. No. 11/923,451, filed on Oct. 24, 2007, by the present inventor, discloses a pipe handling apparatus and method. During testing of the apparatus upon which this application is based, it is shown that there was a certain degree of spring back of the arm upon the release of the pipe onto the drilling rig. During the delivery of the pipe to the drilling rig, the grippers associated with the arm of this apparatus will be handling a great deal of weight (up to 10,000 pounds). This apparatus proved very effective in placing the pipe in a desired location on the drilling rig. However, upon the release of the weight associated with the pipe, the grippers and the arm will have a spring back of up to 10 inches. Under certain circumstances, this spring back could serve to deflect the pipe and create unnecessary stresses on the apparatus. As such, a need developed so as to avoid the spring back associated with the release of the pipe from the grippers and from the arm. Additionally, it was found that by reducing the amount of spring back, the accuracy of the pipe handling apparatus associated with this application could achieve a superior amount of precision in the installation of the pipe. The avoidance of the spring back and the minimization of the deflection caused by the release of the load allows the pipe handling apparatus to be utilized, also, in association with the stabbing of the fine threads of casing into an adjacent casing section supported on the drill rig.

It is an object of the present invention to provide a pipe handling and casing stabbing apparatus and method which minimizes the amount of calibration required in order to move the pipe from a horizontal orientation to a vertical orientation.

It is another object of the present invention to provide a pipe handling and casing stabbing apparatus which operates with a single degree of freedom so as to move the pipe without adjustments between the components.

It is another object of the present invention to provide a pipe handling and casing stabbing apparatus that can be transported on a skid or on a truck.

It is another object of the present invention to provide a pipe handling and casing stabbing apparatus and method which allows for the self-centering of the pipe.

It is another object of the present invention to provide a pipe handling and casing stabbing apparatus and method which can be utilized independent of the existing rig.

It is still a further object of the present invention to provide a pipe handling and casing stabbing apparatus and method which avoids the use of multiple hydraulic cylinders and actuators.

It is still another object of the present invention to provide a pipe handling and casing stabbing apparatus and method which minimizes the amount of instrumentation and controls utilized for carrying out the pipe handling activities.

It is still another object of the present invention to provide a pipe handling and casing stabbing apparatus and method which allows for the pipe to be loaded beneath the lifting boom.

It is still a further object of the present invention to provide a pipe handling and casing stabbing apparatus and method which is of minimal cost and easy to use.

It is still a further object of the present invention to provide a pipe handling and casing stabbing apparatus and method which allows relatively unskilled workers to carry out the pipe handling activities.

It is a further object of the present invention to provide a pipe handling and casing stabbing apparatus and method which avoids spring back of the arm upon release of the load.

It is still an additional object of the present invention to provide a pipe handling and casing stabbing apparatus and method which achieves greater precision in the delivery and installation of pipes and/or casing.

It is still another object of the present invention to provide a pipe handling and casing stabbing apparatus and method which allows casing to be installed in a proper manner such that the threads of the casing engage the threads proper of an adjacent casing.

It is still another object of the present invention to provide a pipe handling and casing stabbing apparatus and method which increases the structural stiffness of the apparatus.

These and other objects and advantages of the present invention will become apparent from a reading of the attached specification and appended claims.

BRIEF SUMMARY OF THE INVENTION

The present invention is a pre-loading system for a pipe handling apparatus in which a boom is pivotally mounted at one end to a skid and in which an arm is interconnected to an opposite end of the boom. The pre-loading system includes a tensioning assembly having a one end affixed to the arm and an opposite end fixedly mounted. The tensioning assembly serves to apply tension to the arm when the arm has a load applied to an end of the arm opposite the boom. In particular, this tensioning assembly serves to avoid any spring back of the arm upon the release of the load from the arm.

In the present invention, the tensioning assembly includes a first cable assembly having one end interconnected to the arm and an opposite end fixedly mounted. This first cable assembly extends from one side of the arm. A second cable assembly also has one end interconnected to the arm and an opposite end fixedly mounted. The second cable assembly extends from an opposite side of the arm. Each of the first and second cable assemblies includes a link member pivotally mounted to the arm, a cable affixed to the link member at one end thereof, a spring pod affixed to an opposite end to the cable, and a member having one end connected to the spring pod and an opposite end affixed to skid. Each of the first and second cable assemblies further comprises a stop affixed to the arm. This stop has a surface suitable for abutting the link when the tensioning assembly applies tension to the arm. The spring pod has a connector element affixed to the opposite end of the cable and to one end of the member, and a resilient assembly interconnected to the connector element. This resilient assembly serves to urge the connector element in a direction away from alignment of the member with the cable. The resilient assembly includes a spring having one end affixed to the skid and an opposite end connected to the connector element. Alternatively, the resilient assembly is a pneumatic cylinder assembly having one end affixed to the skid and an opposite end connected to the connector element. The pneumatic cylinder serves to apply an adjustable tension to the cable.

The member comprises a first elongate element having one end affixed to the skid and an opposite end affixed to the connector element, and a second elongate element having one end affixed to the skid and an opposite end affixed to the connector element. The first and second elongate elements extend at an acute angle with respect to each other.

The present invention is also a pipe handling apparatus that comprises a boom that is pivotally movable between a first position and a second position, a lever pivotally connected to the boom, an arm pivotally connected at one end to the lever and extending outwardly therefrom, a gripper assembly affixed to an opposite end of the arm suitable for gripping a diameter of the pipe, a link pivotally connected to the lever and pivotable at an end so as to move relative to the movement of the boom between the first and second positions, a brace having a one end pivotally connected to the boom and an opposite end pivotally connected to the arm between the ends of the arm, and a tensioning assembly having one end affixed to the arm and an opposite end fixedly mounted. The tensioning assembly serves to apply tension to the arm when the arm has a pipe or a casing applied at one end of the arm opposite the boom.

The present invention is also a method of moving a pipe from a horizontal orientation. This method comprises the steps of: (1) extending a boom over the horizontally-oriented pipe such that grippers are positioned adjacent to the horizontally-oriented pipe; (2) gripping the horizontally-oriented pipe with the grippers; (3) pivoting the boom upwardly such that the pipe is moved angularly through an interior of the boom until the pipe is in a vertical orientation; and (4) applying tension to the arm at a location in spaced relationship to the grippers when the pipe is in the vertical orientation. The step of applying tension includes extending the cable assembly away from the arm toward the skid, and resiliently drawing the cable assembly away from linear orientation at a location between the arm and the skid. In particular, this involves connecting a link member to the arm, connecting the cable to the link member at an end of the link member opposite the arm, and rotating the link member as the boom moves from the horizontally-oriented position to the position in which the pipe is in vertical orientation.

DETAILED DESCRIPTION OF THE INVENTION

Figure 1:
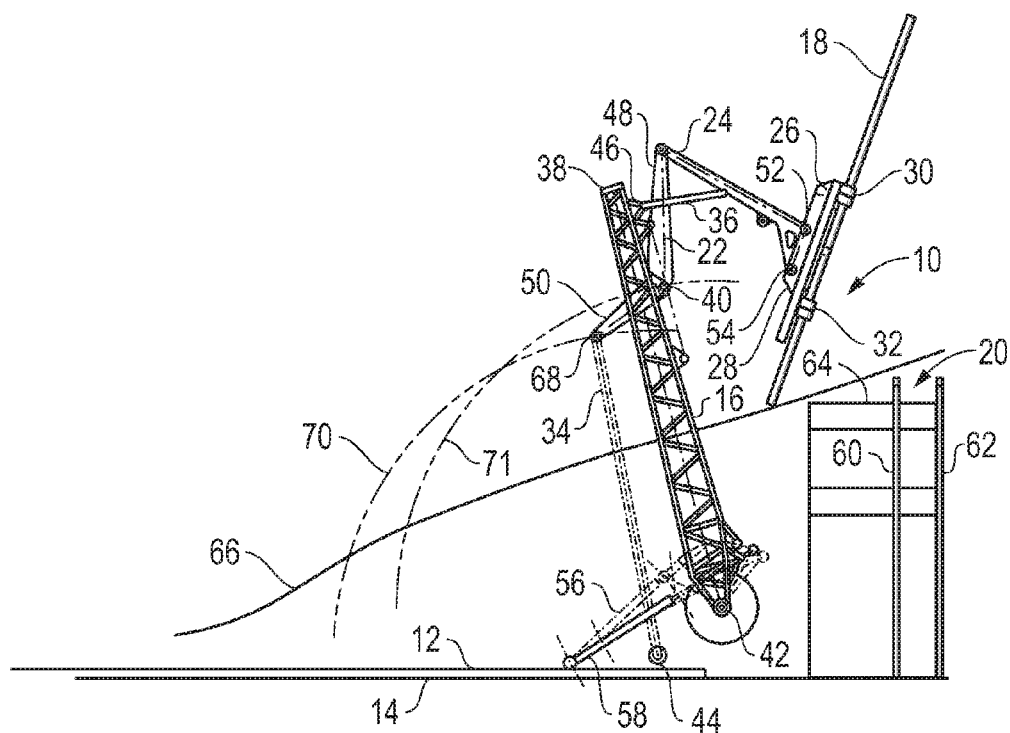
FIG. 1 is a side elevation view showing the pipe handling apparatus in accordance with the teachings of the preferred embodiment of the present invention.

Referring to FIG. 1, there is shown the pipe handling apparatus 10 in accordance with the preferred embodiment of the present invention. The pipe handling apparatus 10 is mounted on a skid 12 that is supported upon the bed 14 of a vehicle, such as a truck. The pipe handling apparatus 10 in particular includes a boom 16 that is pivotally movable between a first position and a second position. In FIG. 1, an intermediate position of the pipe handling apparatus 10 is particularly shown. In this position, the pipe 18 is illustrated in its position prior to installation on the drill rig 20. A lever 22 is pivotally connected to the boom 16. An arm 24 is pivotally connected to an end of the lever 22 opposite the boom 16. A gripping assembly 26 is fixedly connected to an opposite end of the arm 24 opposite the lever 22. The gripping assembly 26 includes a body 28 and grippers 30 and 32. A link 34 has one end pivotally connected to the skid 12 and an opposite end pivotally connected to the end of the lever 22 opposite the arm 24. A brace 36 is pivotally connected to the boom 16 and also pivotally connected to the arm 24 between the lever 22 and the body 28 of gripping assembly 26.

In the present invention, the boom 16 is a structural framework of struts, cross members and beams. In particular, in the present invention, the boom 16 is configured so as to have an open interior such that the pipe 18 will be able to be lifted in a manner so as to pass through the interior of the boom 16. As such, the end 38 of the boom 16 should be strongly reinforced so as to provide the necessary structural integrity to the boom 16. A lug 40 extends outwardly from one side of the boom 16. This lug 40 is suitable for pivotable connection to the lever 22. The boom 16 is pivotally connected at the opposite end 42 to a location on the skid 12. The pivotable connection at end 42 of the boom 16 is located in offset relationship and above the pivotable connection 44 of the link 34 with the skid 12. A small frame member 46 extends outwardly from the side of the boom 16 opposite the link 34. This frame assembly 46 has a pivotable connection with the brace 36.

The lever 22 includes a first portion 48 and a second portion 50. The first portion 48 extends at an obtuse angle with respect to the second portion 50. The link 34 is pivotally connected to the end of the second portion 50 opposite the first portion 48. The arm 24 is pivotally connected to the end of the first portion 48 opposite the second portion 50. The lug 40 of the boom 16 is pivotally connected in an area generally between the first portion 48 and the second portion 50. This unique arrangement of the lever 22 facilitates the ability of the present invention to carry out the movement of the pipe 18 between the horizontal orientation and the vertical orientation.

The arm 24 has an end pivotally connected to the end of the first portion 48 of the lever 22. The opposite end of the arm 24 is connected to the gripping assembly 26. In particular, a pair of pin connections engages a surface of the body 28 of the gripping assembly 26 so as to fixedly position the gripping assembly 26 with respect to the end of the arm 24. The pin connections 52 and 54 can be in the nature of bolts, or other fasteners, so as to strongly connect the body 28 of the gripping assembly 26 with the arm 24. The bolts associated with pin connections 52 and 54 can be removed such that other gripping assemblies 26 can be affixed to the end of the arm 24. As such, the pipe handling apparatus 10 of the present invention can be adaptable to various sizes of pipe 18 and various heights of drilling rigs 20.

The gripping assembly 26 includes the body 28 with the grippers 30 and 32 translatable along the length of the body 28. This vertical translation of the grippers 30 and 32 allows the pipe 18 to be properly moved upwardly and downwardly once the vertical orientation of the pipe 18 is achieved. The grippers 30 and 32 are in the nature of conventional grippers which can open and close so as to engage the outer diameter of the pipe 18, as desired.

The link 34 is an elongate member that extends from the pivotable connection 44 to the pivotable connection 68 of the second portion 50 of the lever 22. The link 34 is non-extensible and extends generally adjacent to the opposite side from the boom 16 from that of the arm 24. The link 34 will generally move relative to the movement of the boom 16. The brace 36 is pivotally connected to the small framework 46 associated with boom 16 and also pivotally connected at a location along the arm 24 between the ends thereof. Brace 36 provides structural support to the arm 24 and also facilitates the desired movement of the arm 24 during the movement of the pipe 18 between the horizontal orientation and the vertical orientation.

Actuators 56 and 58 are illustrated as having one end connected to the skid 12 and an opposite end connected to the boom 16 in a location above the end 42. When the actuators 56 and 58 are activated, they will pivot the boom 16 upwardly from the horizontal orientation ultimately to a position beyond vertical so as to cause the pipe 18 to achieve a vertical orientation. Within the concept of the present invention, a single hydraulic actuator can be utilized instead of the pair of hydraulic actuators 56 and 58, as illustrated in FIG. 1.

The drilling rig 20 is illustrated as having drill pipes 60 and 62 extending upwardly so as to have an end above the drill floor 64. When the pipe 18 is in its vertical orientation, the translatable movement of the grippers 30 and 32 can be utilized so as to cause the end of the pipe 18 to engage with the box of one of the drill pipes 60 and 62.

In FIG. 1, the general movement of the bottom end of the pipe 18 is illustrated by line 66. The movement of the pivot point 68 of the connection between the lever 22 and the link 34 is illustrated by line 70. Curved line 71 illustrates the movement of the pivotable connection 40 between the boom 16 and the lever 22.

In the present invention, the coordinated movement of each of the non-extensible members of the apparatus 10 is achieved with proper sizing and angular relationships. In essence, the present invention provides a four-bar link between the various components. As a result, the movement of the drill pipe 18 between a horizontal orientation and a vertical orientation can be achieved purely through the mechanics associated with the various components. As can be seen, only a single hydraulic actuator may be necessary so as to achieve this desired movement. There does not need to be coordinated movement of hydraulic actuators. The hydraulic actuators are only used for the pivoting of the boom. Since the skid 12 is located on the bed of a vehicle 14, the vehicle 14 can be maneuvered into place so as to properly align with the centerline of the drill pipes 60 and 62 of the drilling rig 20. Once the proper alignment is achieved by the vehicle 14, the apparatus 10 can be operated so as to effectively move the drill pipe to its desired position. The gripper assemblies of the present invention allow the drill pipe 18 to be moved upwardly and downwardly for the proper stabbing of the drill pipes 60 and 62. The present invention is adaptable to various links of pipe 18.

Various types of gripping assemblies 26 can be installed on the end of the arm 24 so as to properly accommodate longer lengths of pipe 18. These variations are illustrated herein in connections shown in FIGS. 6-9.

As such, instead of the complex control mechanisms that are required with prior art systems, the present invention achieves its results by simple maneuvering of the vehicle 14, along with operation of the hydraulic cylinders 56 and 58. All other linkages and movement of the pipe 18 are achieved purely because of the mechanical connections between the various components. As such, the present invention assures a precise, self-centering of the pipe 18 with respect to the desired connecting pipe. This is accomplished with only a single degree of freedom in the pipe handling system.

Figure 2:
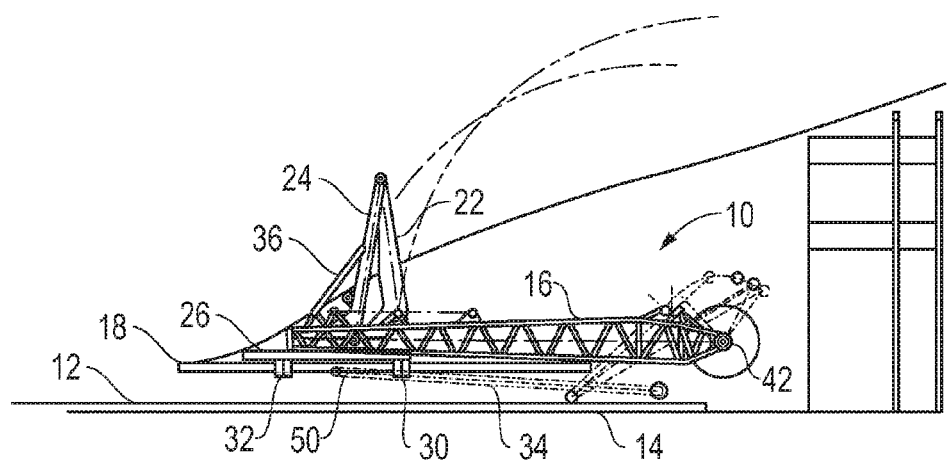
FIG. 2 is a side elevational view showing the pipe handling apparatus of the present invention in a first position.

FIG. 2 illustrates the drill pipe 18 in a generally horizontal orientation. In the present invention, it is important to note that the drill pipe can be delivered to the apparatus 10 in a position below the boom 16. In particular, the drill pipe can be loaded upon the skid 12 in a location generally adjacent to the grippers 30 and 32 associated with the gripping assembly 26. As such, the present invention facilitates the easy delivery of the drill pipe to the desired location. The grippers 30 and 32 will grip the outer diameter of the pipe 18 in this horizontal orientation.

In FIG. 2, it can be seen that the boom 16 resides above the drill pipe 18 and in generally parallel relationship to the top surface of the skid 12. The lever 22 is suitably pivoted so that the arm 24 extends through the interior of the framework of the boom 16 and such that the gripping assembly 26 engages the pipe 18. The brace 36 resides in connection with the small framework of the boom 16 and also is pivotally connected to the arm 24. The link 34 will reside below the boom 16 generally adjacent to the upper surface of the skid 12 and is connected to the second portion 50 of the lever 22 below the boom 16.

Figure 3:
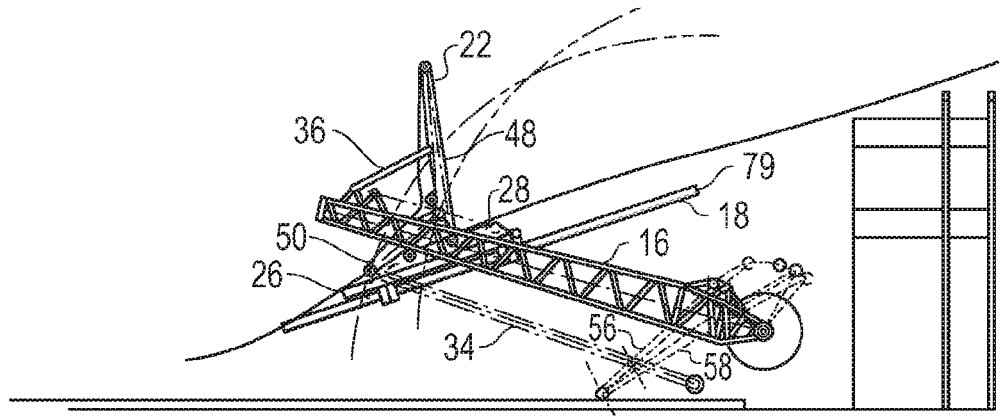
FIG. 3 is a side elevational view showing the pipe handling apparatus moving from the first position toward the second position.

FIG. 3 shows an intermediate position of the drill pipe 18 during the movement from the horizontal orientation to the vertical orientation. As can be seen, the gripping assembly 26 has engaged with the pipe 18. The lever 22 is pivoting so that the end 70 of pipe 18 will pass through the interior of the framework of the boom 16. Also, the arm associated with the gripping assembly 26 serves to move the body 28 of the gripping assembly 26 through the interior of the framework of the boom 16. The brace 36 is pulling on the first portion 48 of lever 22 so as to cause this motion to occur. The link 34 is pulling on the end of the second portion 50 of the lever 22 so as to draw the first portion 48 upwardly and to cause the movement of the body 28 of the gripping assembly 26. The hydraulic actuators 56 and 58 have been operated so as to urge the boom 16 pivotally upwardly.

Figure 4:
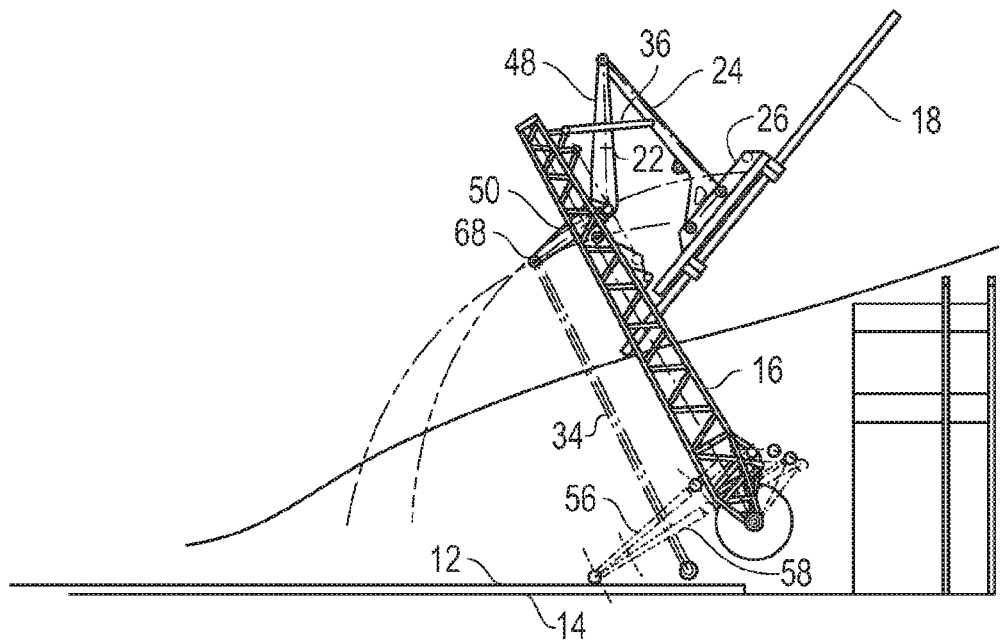
FIG. 4 is a side elevational view of the pipe handling apparatus showing the pipe handling apparatus as moving the pipe further to the second position.

FIG. 4 shows a further intermediate movement of the drill pipe 18. Once again, the hydraulic actuators 56 and 58 urge the boom 16 angularly upwardly away from the top surface of the skid 12. This causes the link 34 to have a pulling force on the pivotal connection 68 of the second portion 50 of the lever 22. This causes the first portion 48 of the lever 22 to move upwardly thereby causing the arm 24, in combination with the brace 36, to lift the gripping assembly 26 further upwardly and draw the pipe 18 completely through the interior of the boom 16. As can be seen, the relative size and relation of the various components of the present invention achieve the movement of the pipe 18 without the need for separate hydraulic actuators.

Figure 5:
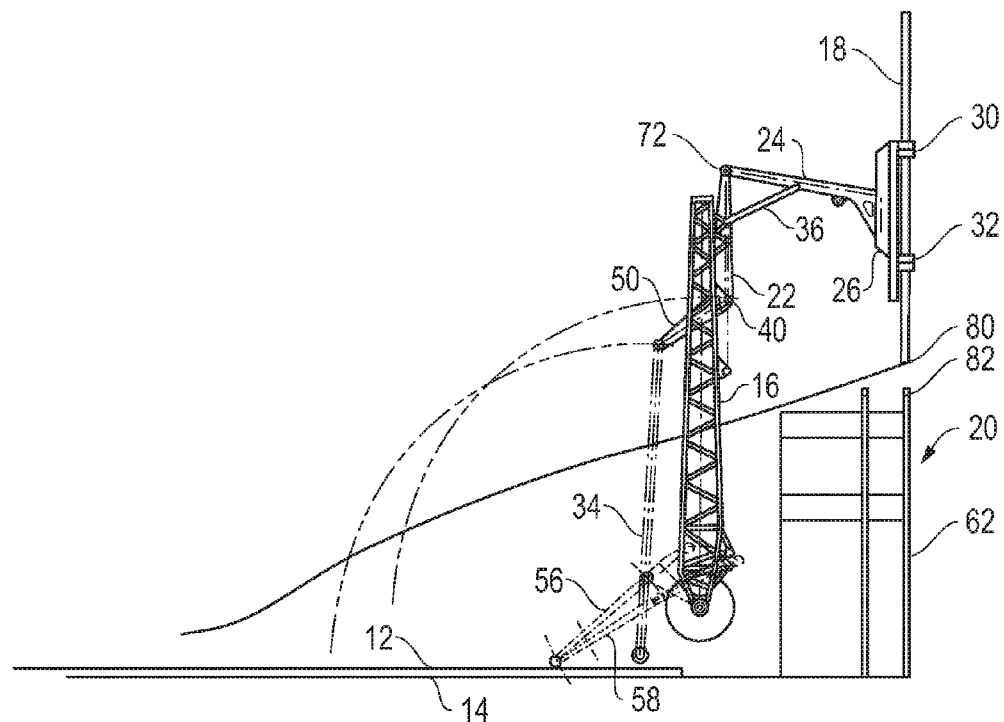
FIG. 5 is a side elevational view showing the pipe handling apparatus in its second position in which the pipe extends in a vertical orientation.

FIG. 5 illustrates the drill pipe 18 in its vertical orientation. As can be seen, the drill pipe 18 is positioned directly above the underlying pipe 62 on the drilling rig 20. The further upward pivotal movement of the boom 16 is caused by the hydraulic cylinders 56 and 58. This causes the link 34 to rotate and draw the end of the second portion 50 of the lever 22 downwardly. The lever 22 rotates about the pivot point 40 such that the first portion 48 of the lever 22 has a pivot 72 at its upper end. The brace 36 is now rotated in a position so as to provide support for the arm 24 in this upper position. The gripping assembly 26 has grippers 30 and 32 aligned vertically and in spaced parallel relationship to each other. If any further precise movement is required between the bottom end 80 of the pipe 18 and the upper end 82 of pipe 62, then the vehicle 14 can be moved slightly so as to achieve further precise movement. In the manner described hereinbefore, the drill pipe 18 has achieved a completely vertical orientation by virtue of the interrelationship of the various components of the present invention and without the need for complex control mechanisms and hydraulics.

In order to install the drill pipe 18 upon the pipe 62, it is only necessary to vertically translate the grippers 30 and 32 within the body 28 of the gripping assembly 26. As such, the end 80 may be stabbed into the box connection 82 of pipe 62. Suitable tongs, spinners, or other mechanisms may be utilized so as to rotate the pipe 18 in order to achieve a desired connection. The grippers 30 and 32 may then be released from the exterior of the pipe 18 and returned back to the original position such that another length of drill pipe can be installed.

Figure 6:
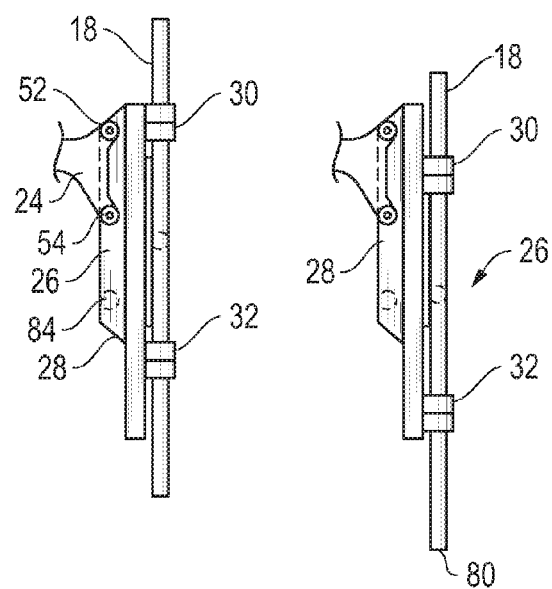
FIG. 6 is an illustration of the gripper assembly as vertically translating the pipe.

FIG. 6 is a detailed view of the gripping assembly 26 of the present invention. In FIG. 6, the pin connections 52 and 54 have been installed into alternative holes formed on the body 28 of the gripping assembly 26. The holes, such as hole 84, may be formed in a surface of the body 28 so as to allow selective connection between the end of the arm 24 and the body 28 of gripping assembly 26. As such, the position of the gripping assembly 26 in relation to the arm 24 may be adapted to various circumstances.

It can be seen that the pipe 18 is engaged by grippers 30 and 32 of the gripping assembly 26. The configuration of the grippers 30 and 32, as shown in FIG. 6, is particularly designed for a short length (approximately 30 feet) of drill pipe. In FIG. 6, it can be seen that the grippers 30 and 32 are translated relative to the body 28 so as to lower end 80 of pipe 18 downwardly for connection to an underlying pipe.

Figure 7:
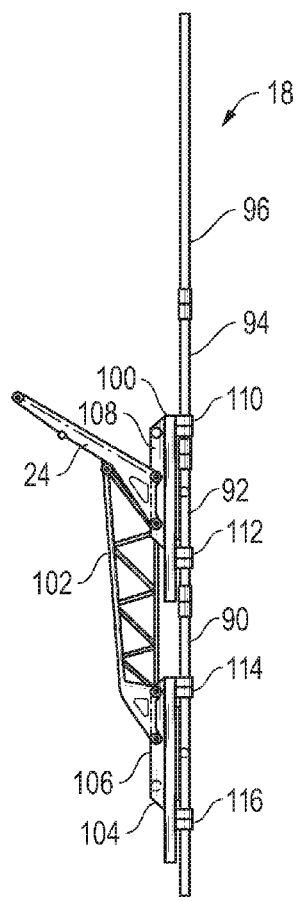
FIG. 7 is a side elevational view of a first alternative embodiment of the gripper assembly of the present invention.

Occasionally, it is necessary to accommodate longer lengths of pipe. In other circumstances, it is desirable to accommodate pipes that are already assembled in an extended length. In FIG. 7, it can be seen that the drill pipe 18 is formed of separate sections 90, 92, 94, and 96 that are joined in end-to-end connection so as to form an extended length of the pipe 18. When such pipe arrangements are required, the gripping assembly 26 of the present invention may be adapted so as to accommodate such extended lengths. Fortunately, the structure of the apparatus 10 of the present invention may accommodate such an arrangement. As can be seen in FIG. 7, the arm 24 is connected to a first gripper assembly 100 and connected by framework 102 to a second gripper assembly 104. The second gripper assembly 104 is located directly below and vertically aligned with the first gripper assembly 100. The framework 102 includes a suitable pin connection for engaging the body 106 of the second gripper assembly 104. The first gripper assembly 100 has body 108 that is directly connected to the pin connections associated with the arm 24. The gripping assembly 100 includes grippers 110 and 112 which engage in intermediate position along the length of pipe 18. The grippers 114 and 116 of the second gripper assembly 104 engage the lower portion of the pipe 18. The method of moving the pipe 18 from the horizontal position to the vertical position is similar to that described hereinbefore.

It should be noted that the arm 24 can extend at various angles with respect to the gripper assemblies 100 and 104. In the preferred embodiment, the arm 24 will be generally transverse to the length of the body associated with the gripper assemblies 100 and 104. However, if needed to accommodate certain drilling rig height and arrangements, the arm 24 may be angled up to 30° from transverse with respect to the body associated with the gripper assemblies 100 and 104.

Figure 8:
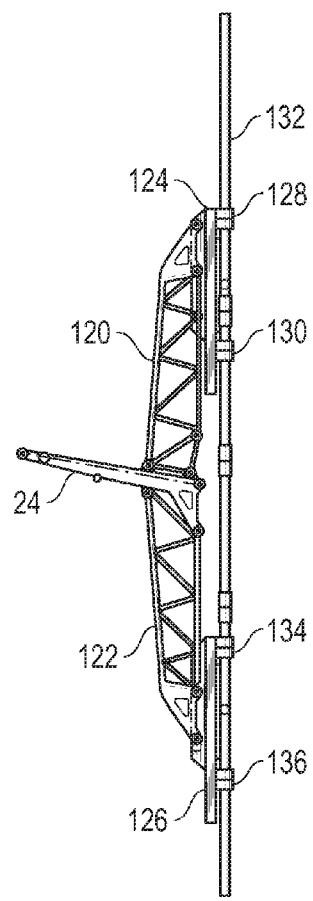
FIG. 8 is a side elevational view showing a second alternative embodiment of the gripper assembly of the present invention.

In FIG. 8, it can be seen that the arm 24 has a first framework 120 extending upwardly from the top of the arm 24 and a second framework 122 extending below the arm 24. The framework 120 includes a gripper assembly 124 affixed thereto. The framework 122 includes a gripper assembly 126 connected thereto. The arm 24 may include suitable pin connections located on the top surface thereof and on the bottom surface thereof so as to engage with the frameworks 120 and 122. The gripper assembly 124 has suitable grippers 128 and 130 for engaging an upper portion of the pipe 132. The gripper assembly 126 includes grippers 134 and 136 for engaging with a lower portion of the pipe 132. As illustrated in FIG. 8, the pipe 132 is a multiple section pipe. However, pipe 132 may be an extended length of a single pipe section.

Figure 9:
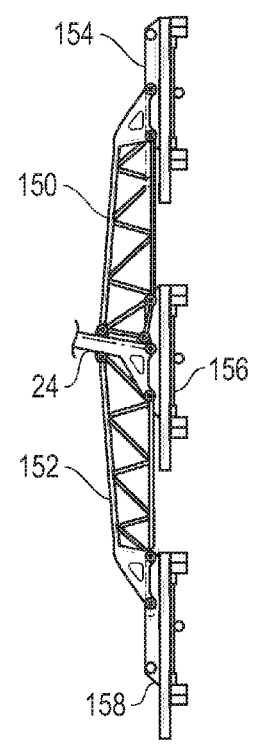
FIG. 9 is a side elevational view showing a third alternative embodiment of the gripper assembly of the present invention.

FIG. 9 shows still another embodiment of the gripper assembly structure of the present invention. In FIG. 9, the arm 24 is connected to the upper framework 150 and to the lower framework 152. Gripping assemblies 154, 156 and 158 are provided. The gripper assembly 154 is connected to an upper end of the upper framework 150. The gripper assembly 158 is connected to a lower end of the lower framework 152. The gripper assembly 156 is intermediately located directly on the opposite side of the end of the arm 24 and connected to the lower end of the upper framework 150 and to the upper end of the lower framework 152. As such, the present invention provides up to three gripper assemblies 154, 156, and 158 to be connected. This can be utilized so as to accommodate even longer lengths of pipe, if needed.

The present invention achieves a number of advantages over the prior art. Most importantly, the present invention provides a pipe handling apparatus and method that minimizes the number of control mechanisms, sensors and hydraulic systems associated with the pipe handling system.

Since the movement of the pipe is achieved in a purely mechanical way, only a single hydraulic actuator is necessary for the movement of the boom. All of the other movements are achieved by the interrelationship of the various components. As such, the present invention achieves freedom from the errors and deviations that can occur through the use of multiple hydraulic systems. The simplicity of the present invention facilitates the ability of a relatively unskilled worker to operate the pipe handling system. The amount of calibration is relatively minimal. Since the skid 12 associated with the present invention may be transported by a truck, various fine movements and the location of the pipe handling apparatus 10 can be achieved through the simple movement of the vehicle. The pipe handling apparatus 10 of the present invention is independent of the drilling rig. As such, a single pipe handling apparatus that is built in accordance with the teachings of the present invention may be utilized on a number of rigs and may be utilized at any time when required. There is no need to modify the drilling rig, in any way, to accommodate the pipe handling apparatus of the present invention. Since the pipes are loaded beneath the boom, the providing of the pipe to the pipe handling apparatus may be achieved in a very simple manner. There is no need to lift the pipes to a particular elevation or orientation in order to initiate the pipe handling system.

Figure 10:
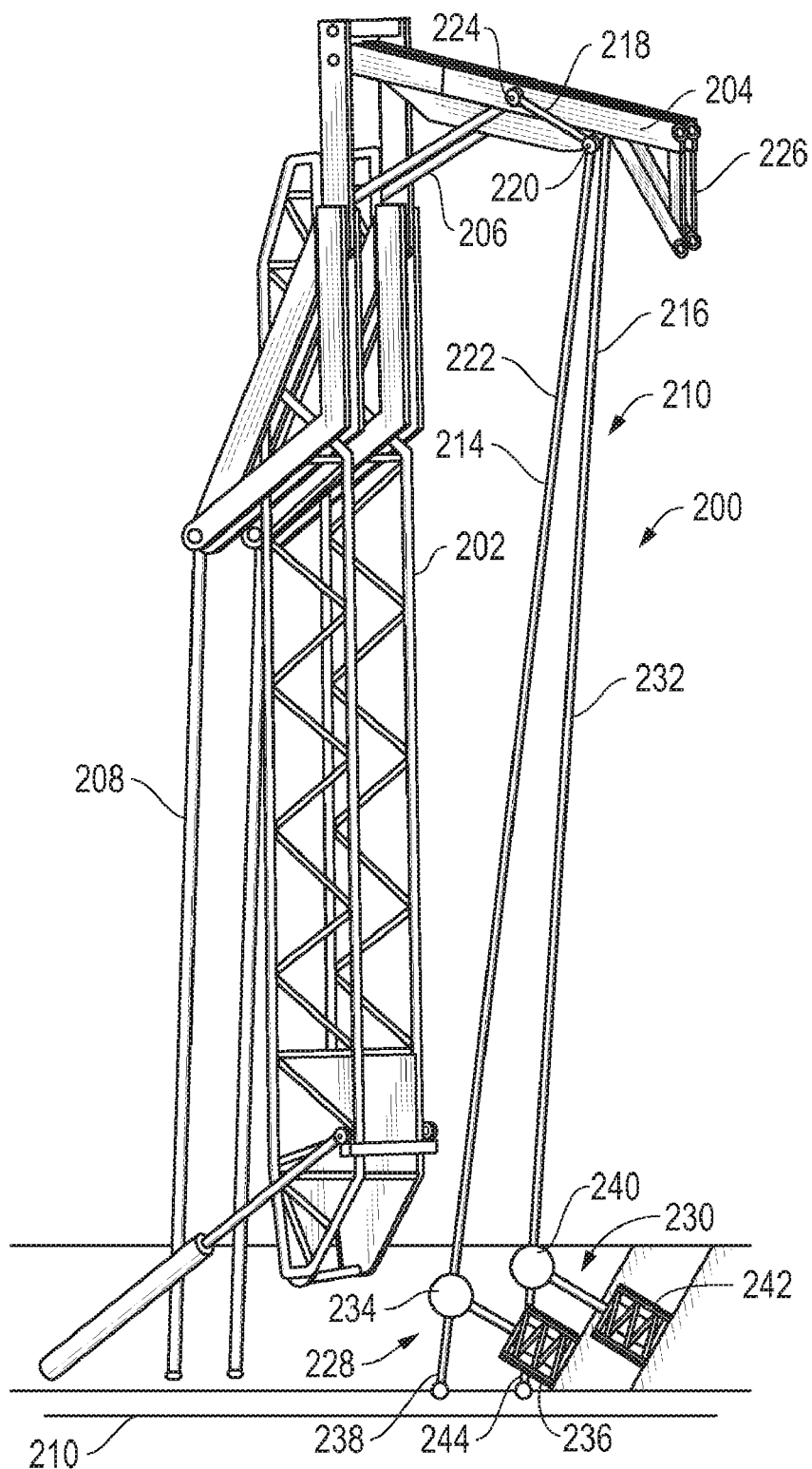
FIG. 10 shows a perspective view in which the tensioning system is applied to the arm of the pipe handling apparatus in accordance with the teachings of the present invention.

Referring to FIG. 10, there is shown the pipe handling and casing stabbing apparatus 200 in accordance with the teachings of the present invention. The pipe handling and casing stabbing apparatus 200 has a configuration of boom 202, arm 204, brace 206, link 208, and skid 210 similar to the construction described herein previously. The pipe handling and casing stabbing apparatus 200 includes the addition of a tensioning assembly 210 applied to the arm 204 and to the skid 210.

The tensioning assembly 210 includes a first cable assembly 214 and a second cable assembly 216 which are affixed on opposite sides of the arm 204. In particular, the first cable assembly 214 is affixed to a link member 218 that is fixedly pivotally mounted on the arm 204. A stop 220 extends outwardly from the side of the arm 204. The stop 220 serves to stop rotational movement of the link member 218 as the arm 204 moves in a proper direction for the delivery of pipe and/or casing. The cable assembly 214 also includes a cable 222 that has one end affixed to the link member 218 opposite the pivotal connection 224 with arm 204. The cable 222 extends downwardly from the arm 204 so as to be interconnected to the skid 210. In FIG. 10, the cable assemblies 214 and 216 are shown as applying tension to the arm 204. This tension serves to offset the load of the pipe as received by the grippers which are affixed to the end 226 of arm 204 (not shown). The second cable assembly 216 has a configuration identical to that of first cable assembly 214.

Importantly, a first spring pod 228 is connected to the end of the cable 222 opposite the arm 204. A second spring pod 230 is affixed to the cable 232 associated with the second cable assembly 216. The spring pods 228 and 230 serve to apply an angular deflection to each of the cable assemblies 214 and 216 so as to selectively supply tension to the arm 204.

As may be seen, a connector element 234 is connected to the end of cable 222. Connector element 234 is also connected to a resilient assembly 236. An elongate member 238 joins the connector element 234 to the skid 210. Similarly, the cable 232 has an end opposite the arm 204 connected to the connector element 240. Another resilient assembly 242 is joined to the connector element 240 so as to cause a deflection in the cable assembly 216. The resilient assembly 242 is fixedly positioned on the skid 210. Another elongate member 244 joins the connector element 240 to the skid 210.

In normal use, the resilient assemblies 236 and 242 serve to exert a resilient force which urges each of the cable assemblies 214 and 216 slightly out of linear alignment between the respective cables 222 and 232 with the elongate members 238 and 244. By pulling the connector elements 234 and 240, respectively, toward the resilient assemblies 236 and 242, a greater degree of tension can be applied to the cable assemblies 214 and 216 and, in turn, to the arm 204.

As used herein, each of the resilient assemblies 236 and 242 may be in the form of spring assemblies, as illustrated in FIG. 10, or may be in the nature of a pneumatic cylinder.

Figure 11:
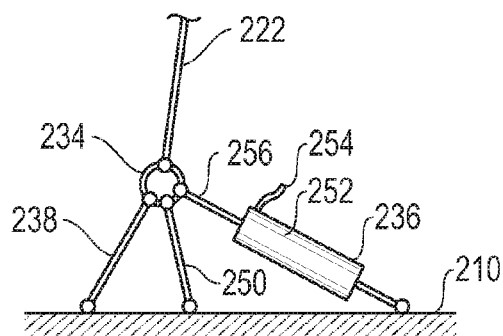
FIG. 11 is a diagrammatic illustration of the resilient assembly utilized to deflect the cables associated with the pre-loading system of the present invention.

In particular, in FIG. 11, it may be seen how the cable 222 is connected to the connector element 234 and to a pair of elongate members 238 and 250. The first elongate member 238 extends at an acute angle with respect to the second elongate member 250. The resilient assembly 236 is in the form of a pneumatic cylinder 252. A source of pneumatic pressure 254 communicates with the interior of the pneumatic cylinder 252 so as to allow for the adjustment of the degree of movement of the piston 256. As the piston 256 is drawn into the pneumatic cylinder 252, the piston 256 will draw the connector element 234 toward the pneumatic cylinder 252 and increase the amount of deflection between the elongate members 238 and 250 relative to the cable 222. The pneumatic cylinder 252 is affixed to the skid 210 at an end opposite the connector element 234.

The pre-loading system 200, as shown in FIGS. 10 and 11 greatly enhances the ability to avoid spring back and to establish greater precession in the delivery of pipe and/or casing to the drilling rig. It has been found that, in experimental tests, 0.03 inches of total lateral motion applied to the cable assemblies 214 and 216 allows for the removal or addition of 10,000 pounds (the maximum payload) of load applied to the arm 204. The ability to avoid the spring back and to achieve this maximum accuracy allows the present invention to stab casing within a ⅛ of an inch tolerance. This deflection of the cable assemblies 214 and 216 increases the stiffness of the pipe handling apparatus of the present invention by a factor of 300. The load is shifted directly from the arm 204 toward the stop and the anchoring on the skid 210 instead of directly on the arm.

Figure 12:
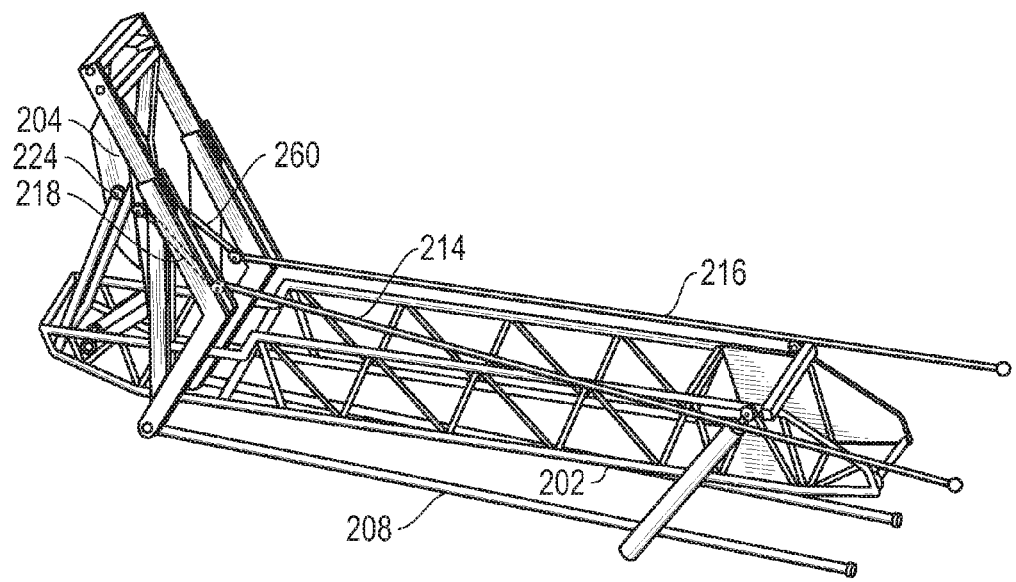
FIG. 12 is a perspective view showing the orientation of the pre-loading system of the present invention when the boom is in a generally horizontal orientation.

FIG. 12 shows the boom 202 in its generally horizontal orientation upon the skid 210. In this position, the gripper assemblies associated with the arm 204 are in position to receive a pipe or casing therein. It can be seen that the link members 218 and 260 are in a position away from the respective stops. The link members 218 and 260 may rotate about the pivot point 224 during the movement of the arm 204 and during the movement of the boom 202. The respective cable assemblies 214 and 216 will generally drape along the outside of the boom 202.

Figure 13:
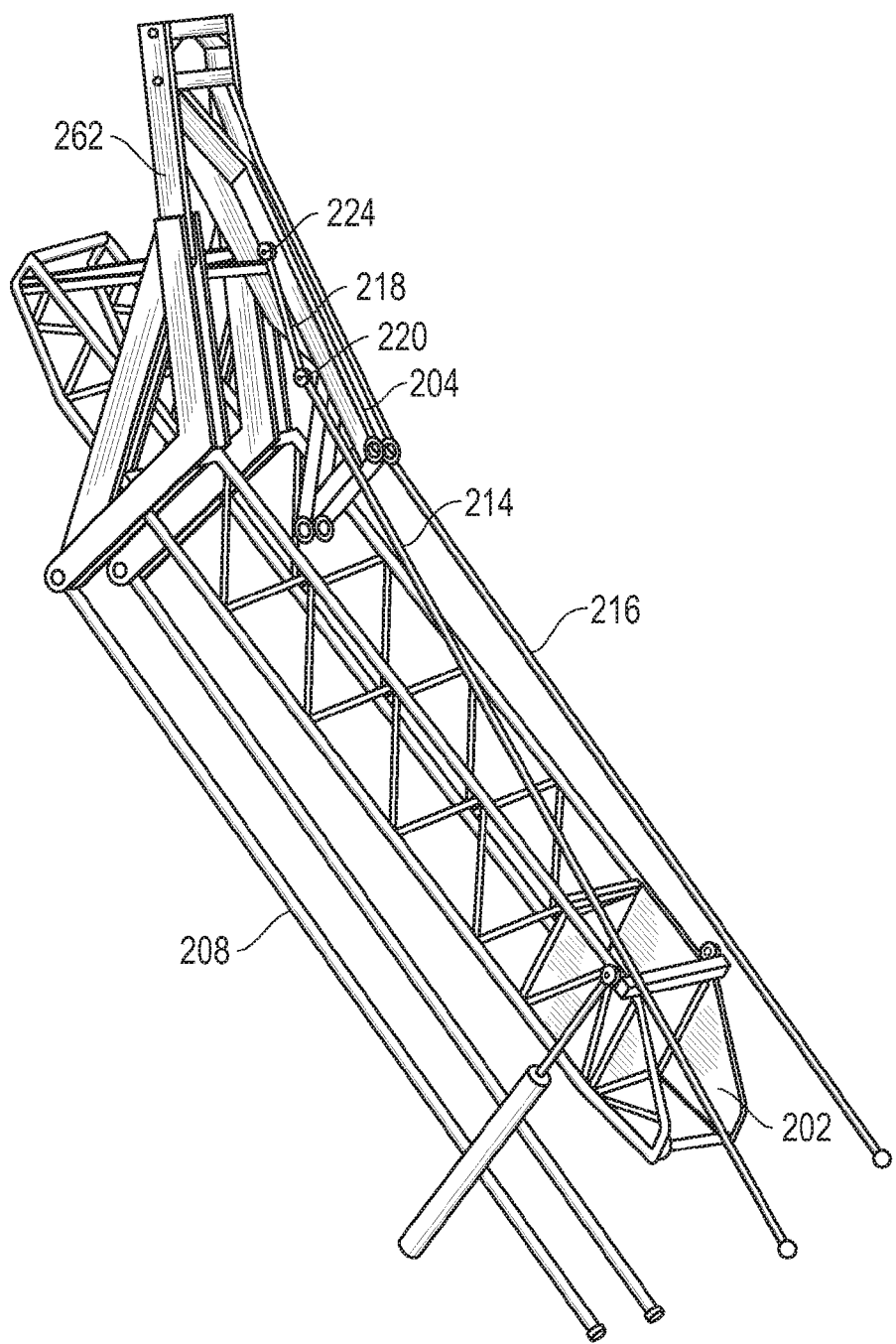
FIG. 13 is a perspective view of the pre-loading system of the present invention as the boom moves from the horizontal orientation toward the vertical orientation.

FIG. 13 shows the movement of the boom 202 from the position adjacent to the skid to the vertical position. As can be seen, the arm 204 is pivoting with respect to lever 262. The link member 218 is pivotable and rotatable about the pivot point 224 during this movement. It can be seen that the arm 204 will move upwardly between the respective cable assemblies 214 and 216. Eventually, the arm 204 will assume a generally horizontal orientation when it is necessary to position the pipe and/or casing into a desired position. This causes the link member 218 to contact the stop 220. As a result, the tensioning of the arm 204 can begin.

The enhanced accuracy and the ability to avoid deflection of the arm 204 during the installation and release of the pipe and/or casing enhances the ability of the present invention to deliver casing to the drilling rig. Since the casing must be delivered with extreme accuracy, the avoidance of deflection, as caused by the present invention, may allow the maximum amount of deflection to be merely 0.3 inches. When the weight of the pipe and/or casing is released, any deflection is absorbed by the stop 220 and by an anchor, such as the skid 210. The arm 204 will be maintained in a generally fixed position at this time, rather than springing back.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A pipe handling apparatus comprising:
 a boom pivotally movable between a first position and a second position;
 a lever pivotally connected to the boom, the lever having a first portion extending outwardly at an obtuse angle with respect to a second portion;
 an arm pivotally connected at one end to the first portion of the lever and extending outwardly therefrom;
 a gripper assembly affixed to an opposite end of the arm, the gripper assembly for gripping a diameter of a pipe;
 a link pivotally connected to the second portion of the lever, the link pivotable at an end of the second portion opposite of the first portion so as to move relative to the movement of the boom between the first and second positions;
 a brace having a one end pivotally connected to the boom and an opposite end pivotally connected to the arm between the ends of the arm; and,
 a tensioning assembly having one end affixed to the arm and an opposite end fixedly mounted, the tensioning assembly for applying tension to the arm when the arm has the pipe received within the gripper assembly.

2. The pipe handling apparatus of claim 1, further comprising:
 a skid extending in a horizontal orientation and positioned below the boom, the boom being pivotally mounted upon the skid.

3. The pipe handling apparatus of claim 2, the tensioning assembly comprising:
 a first cable assembly having one end connected to the arm and an opposite end fixedly mounted, the first cable assembly extending from one side of the arm; and,
 a second cable assembly having one end connected to the arm and an opposite end fixedly mounted, the second cable assembly extending from an opposite side of the arm.

4. The pipe handling apparatus of claim 3, each of the first and second cable assemblies comprising:
 a link member pivotally mounted to the arm;
 a cable affixed to an end of the link member at an end thereof opposite the arm;
 a spring pod affixed to an opposite end of the cable; and,
 an elongate member having one end connected to the spring pod and an opposite end affixed to the skid.

5. The pipe handling apparatus of claim 4, each of the first and second cable assemblies further comprising:
 a stop affixed to the arm, the stop having a surface suitable for abutting the link member when the tensioning assembly applies tension to the arm.

6. The pipe handling apparatus of claim 4, the spring pod comprising:
 a connector element affixed to the opposite end of the cable and to the one end of the elongate member; and, a resilient assembly connected to the connector element, the resilient assembly for urging the connector element in a direction away from alignment of the elongate member with the cable.

7. The pipe handling apparatus of claim 6, the resilient assembly comprising:
a spring having one end affixed to the skid and an opposite end connected to the connector element.

8. The pipe handling apparatus of claim 6, the resilient assembly comprising:
a pneumatic cylinder assembly having one end affixed to the skid and an opposite end connected to the connector element.

9. A method of moving a pipe from a horizontal orientation for installation in a vertical orientation comprising:
extending a boom over the horizontally-oriented pipe such that grippers are positioned adjacent to the horizontally-oriented pipe, the grippers being affixed to an arm pivotally connected to a lever, the lever being pivotally mounted to the boom;
gripping the horizontally-oriented pipe with the grippers;
pivoting the boom upwardly such that the pipe is moved angularly through an interior of the boom and until the pipe is in a vertical orientation; and,
applying tension to the arm at a location in spaced relationship to the lever and to the gripper when the pipe is in the vertical orientation.

10. The method of claim 9, the step of applying tension comprising:
extending a cable assembly from the arm to a fixed mounting position; and,
resiliently drawing the cable assembly away from linear at a location between the arm and the fixed mounting position such that the cable assembly applies a desired amount of tension to the arm.

11. The method of claim 10, further comprising:
connecting a link member to the arm;
connecting the cable to the link member at an end of the link member opposite the arm;
rotating the link member as the boom moves from a position adjacent to the horizontally-oriented pipe to a position in which the boom is pivoted such that the pipe is in vertical orientation; and,
stopping the rotation of the link member when the pipe is in the vertical orientation.

\* \* \* \* \*